(12) United States Patent
Zhang et al.

(10) Patent No.: US 10,824,153 B2
(45) Date of Patent: Nov. 3, 2020

(54) COST DESIGN FOR PATH SELECTION IN AUTONOMOUS DRIVING TECHNOLOGY

(71) Applicant: Baidu USA LLC, Sunnyvale, CA (US)

(72) Inventors: Liangliang Zhang, San Jose, CA (US); Dong Li, Sunnyvale, CA (US); Jiangtao Hu, Sunnyvale, CA (US); Jiaming Tao, Sunnyvale, CA (US); Yifei Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 389 days.

(21) Appl. No.: 15/954,352

(22) Filed: Apr. 16, 2018

(65) Prior Publication Data

US 2019/0317508 A1  Oct. 17, 2019

(51) Int. Cl.
*G05D 1/02* (2020.01)
*G08G 1/16* (2006.01)
*G05D 1/00* (2006.01)

(52) U.S. Cl.
CPC ......... *G05D 1/0214* (2013.01); *G05D 1/0088* (2013.01); *G08G 1/167* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 2015/0353082 A1* | 12/2015 | Lee | B60W 30/10 701/41 |
| 2016/0379485 A1* | 12/2016 | Anastassov | G08G 1/096775 701/117 |
| 2018/0238696 A1* | 8/2018 | Takeda | G01C 21/3694 |
| 2018/0329429 A1* | 11/2018 | Yamaguchi | G05D 1/0285 |
| 2019/0084561 A1* | 3/2019 | Takeda | B60W 30/14 |

* cited by examiner

*Primary Examiner* — Rami Khatib
(74) *Attorney, Agent, or Firm* — Womble Bond Dickinson (US) LLP

(57) ABSTRACT

A new cost design is disclosed for evaluating candidate path curves for navigating an autonomous driving vehicle (ADV) through a segment of a route which may include an obstacle. Each point on each candidate path curve has a plurality of attributes having logical values and an associated priority of evaluation, and at least one numeric attribute having an associated priority of evaluation. A cost for each path curve is determined using the attributes and priorities, and a least cost path curve is selected using the attributes and priorities. By comparing attribute values in accordance with priority, and utilizing logical values, the efficiency of determining path curve cost and selecting a least cost path curve is substantially improved.

21 Claims, 10 Drawing Sheets

COST DESIGN FOR PATH SELECTION IN AUTONOMOUS DRIVING TECHNOLOGY

TECHNICAL FIELD

Embodiments of the present disclosure relate generally to operating autonomous vehicles. More particularly, embodiments of the disclosure relate to determining a cost of a path curve for autonomous driving vehicles (ADVs).

BACKGROUND

Path planning is an important component in Autonomous Driving technology. A typical method for path planning is to sample some lane way points and connect those points by smooth curves, and select one of them based on the cost calculation of each curve. The minimum cost curve will be chosen as the path for the autonomous driving vehicle to follow. However, traditional methods for cost calculation usually use a single value that is the addition of multiple numeric value factors. The traditional way makes the cost difficult or impossible to represent complex environments such that undesired outputs are obtained. Further, computing the cost of a path in the prior art can be computationally expensive, thereby limiting the number of points in the path curve to determine the cost of the path and/or limiting the number of times per second that the path can be updated.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
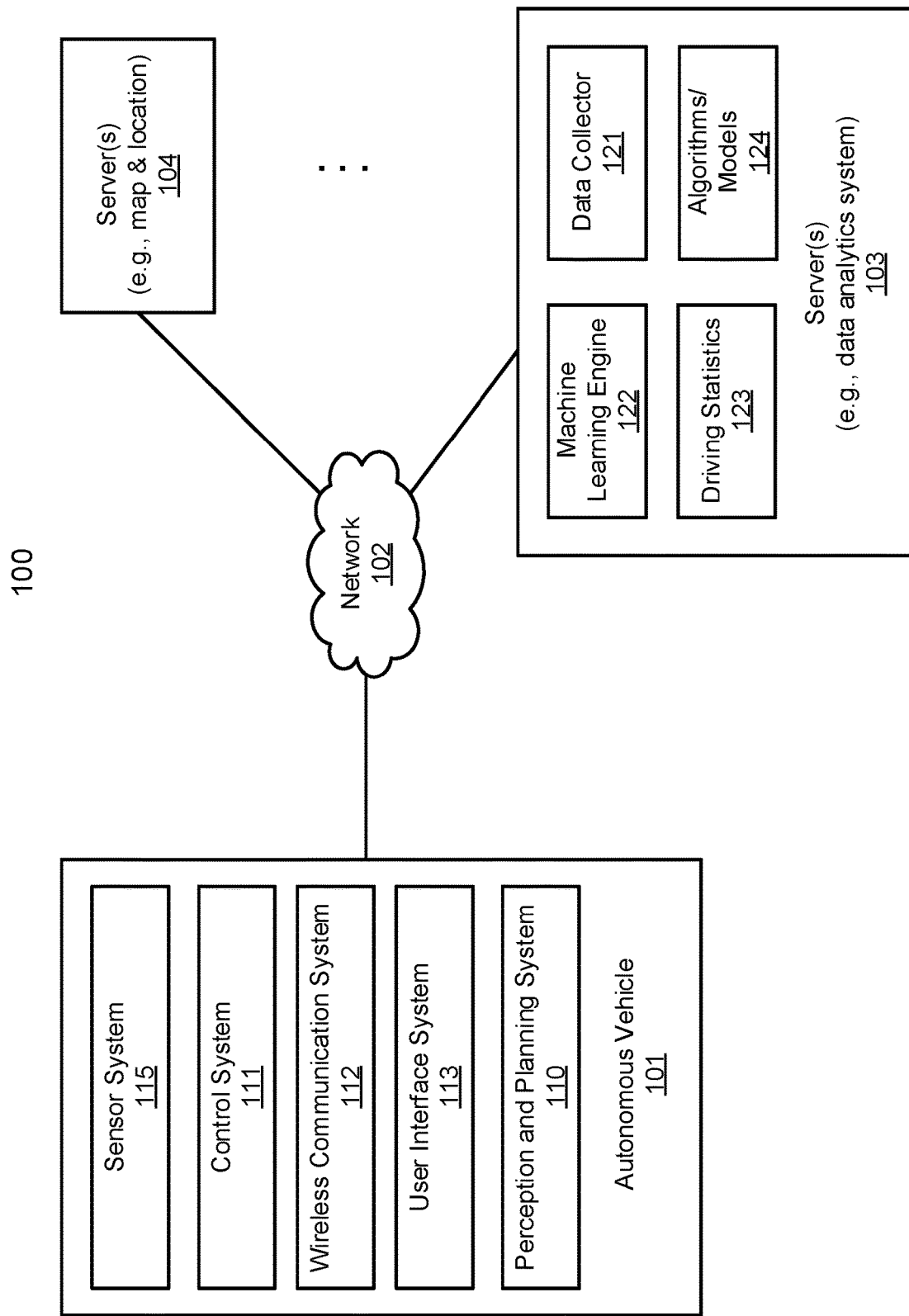
FIG. 1 is a block diagram illustrating a networked system for implementing a new cost design for path selection for an autonomous driving vehicle (ADV), according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method of determining a least-cost path curve can include generating a plurality of candidate path curves for navigating an autonomous driving vehicle (ADV) through a lane of traffic along a driving segment of a route of the ADV. Each candidate path curve (or just, "path curve") has a plurality of points defining the path curve. Each point in the path curve has a plurality of attributes corresponding to a plurality of categories each having an associated priority. For each path curve, a cost of the path curve is determined from the plurality of points defining the path curve, and from the attributes of each point, in accordance with the priority of the plurality of categories. In an embodiment, each point can have an "obstacle" category having a logical value indicating whether the path point coincides with an obstacle to the ADV. Each point can have a "physical lane" category having a logical value indicating whether the ADV would be outside of a physical driving lane at that point, such as a physical roadway edge. Each point can have a "virtual lane" category having a logical value indicating whether the ADV would be outside a virtual lane boundary at that point. A virtual lane can be a portion of the physical lane deemed by ADV logic to be safe for the ADV to drive. Each point can further have a "safety-comfort" having a numeric value indicating safety and/or comfort of the occupants of the ADV at that point in the curve. In an embodiment, a lower value is safer and/or more comfortable for the occupants of the ADV than a higher value. In an embodiment, the obstacle category is higher priority than the physical lane category, the physical lane priority is higher than the virtual lane category, and the virtual lane category is higher than the safety-comfort category. In an embodiment, a logical value can be a Boolean value, such as TRUE or FALSE, or 1 or 0.

In an embodiment, determining a least cost path curve from the plurality of candidate path curves comprises traversing all of the plurality of points of each path curve to determine a cost for each path curve, then selecting a least cost path curve from among the plurality of candidate path curves for navigating the ADV. Each path can have a path cost having the same attributes as any point in the plurality of points of the path curve. In an embodiment, initially, the cost for a path curve can be FALSE for each of the first, second, and third attributes and a numerical false of zero for the fourth attribute. A cost for a path curve is developed by traversing each point in the path curve, and for each point, performing a logical OR operation with each attribute of the cost of the path curve with the corresponding attribute of the point and storing the results of the logical OR operation in the attribute of the cost curve. Then, the safety/comfort value of the point can be added to the safety/comfort value of the cost for the path curve. Determining which path curve has the least cost can include comparing attributes of curves in accordance with priority of the attributes to find the least cost path curve. The least cost path curve is then used by a planning module to navigate the ADV along the segment of a route using the least cost path curve.

FIG. 1 is a block diagram a networked system for implementing a new cost design for path selection for an autonomous driving vehicle (ADV), according to one embodiment. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
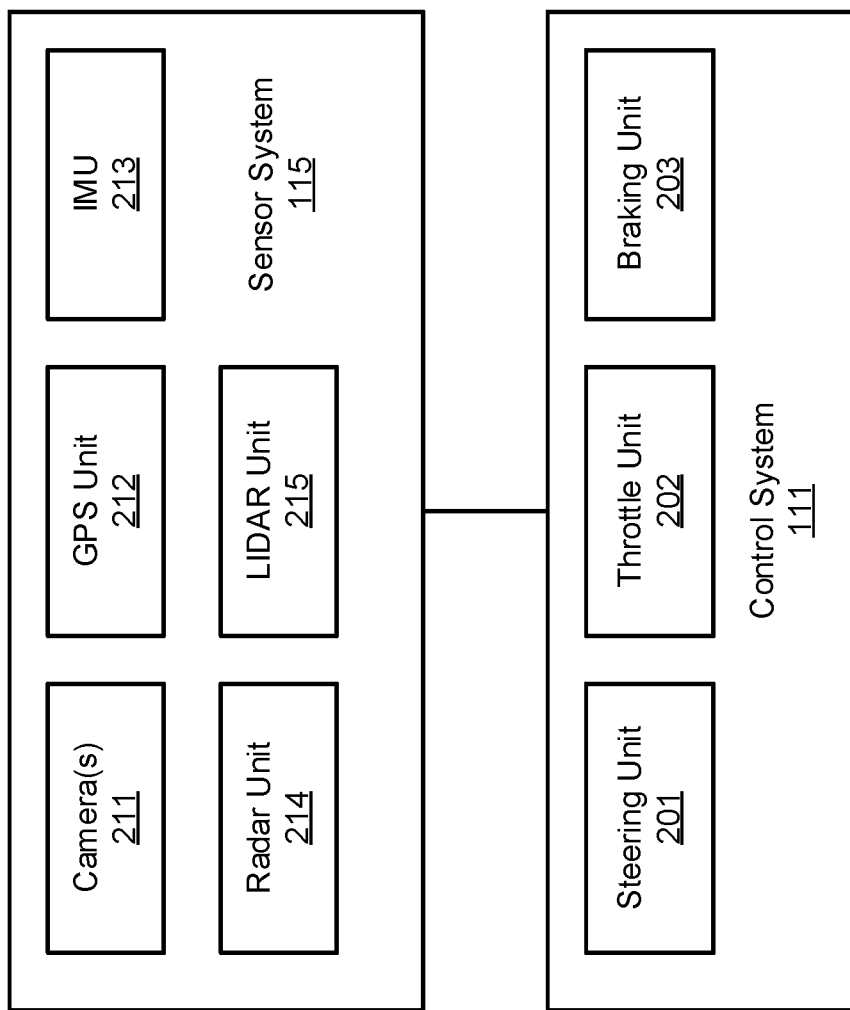
FIG. 2 is a block diagram illustrating an example of an autonomous vehicle for implementing a new cost design for path selection for an autonomous driving vehicle (ADV), according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. Cameras 211 may include an infra-red camera. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof. Control system 111 can include logic to detect failure of each control in the control system 111, as described below with reference to FIG. 3.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently. An optimal route can include a plurality of segment, each of which can be optimized by the perception and planning system 110 by determining an optimal path curve for the segment from a plurality of candidate path curves for the segment, each generated by the perception and planning system 110.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes, including multi-level alarming algorithms for an alarm system to alarm drivers of the autonomous driving vehicles.

Figure 3:
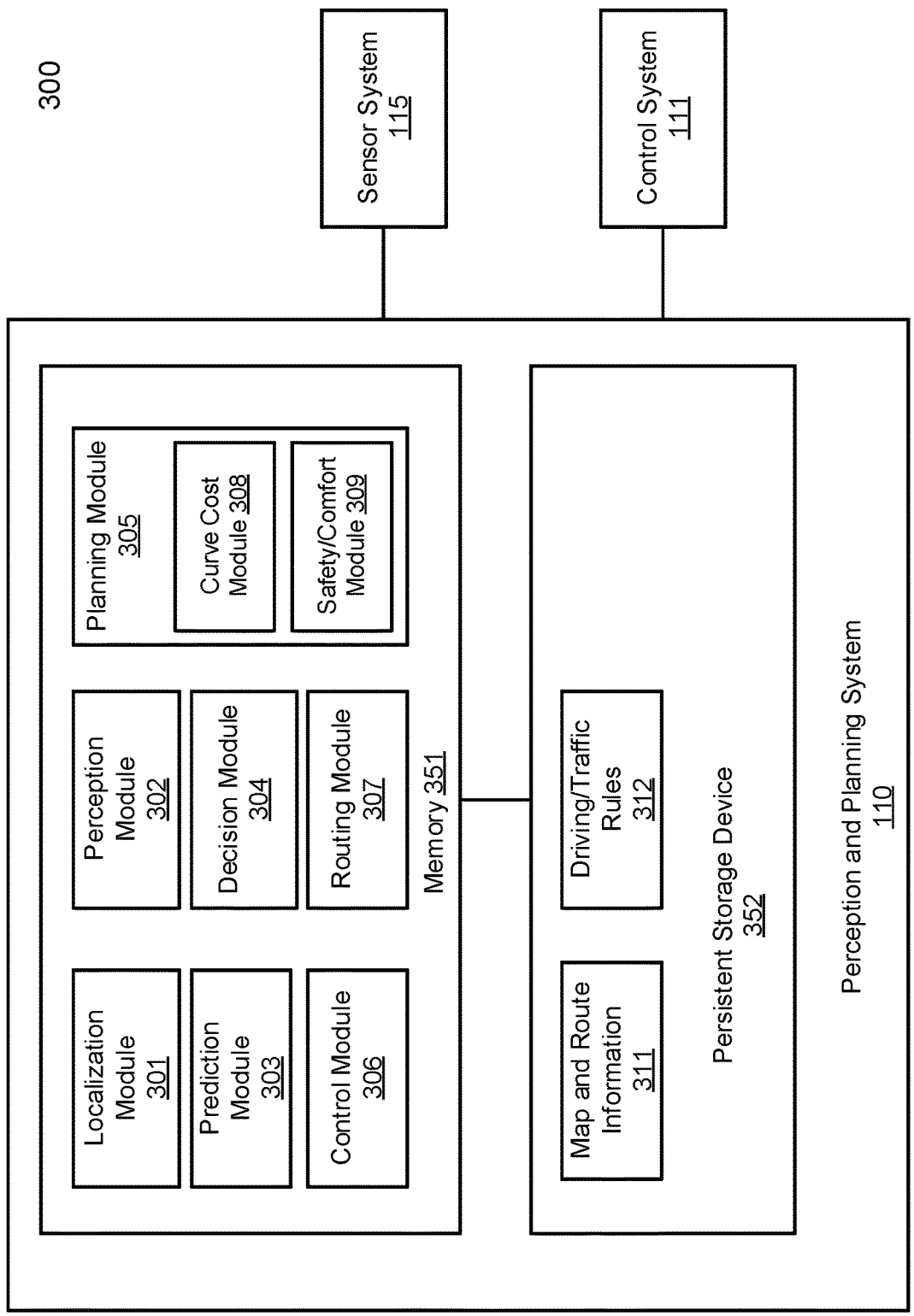
FIG. 3 is a block diagram illustrating an example of a perception and planning system in an ADV that implements a new cost design for path selection for an autonomous driving vehicle, according to one embodiment.

FIG. 3 is a block diagram illustrating an example of a perception and planning system in and ADV that implements a new cost design for path selection for an autonomous driving vehicle (ADV), according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, routing module 307, curve cost module 308, and safety/comfort module 309. Localization module 301 can include map and route data 311 and routing module 307.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 may be referred to as a map and route module. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection.

If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, and the least path curve determined from the plurality of candidate path curves for a driving segment of a route, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time. Examining all of the possible routes can include, for a route selected from the possible route, determining a segment of the selected route, and determining a plurality of candidate path curves for navigating the segment of the selected route. Each candidate path curve can have a "cost" determined for the candidate path curve. The cost of a candidate path curve (or just, "path curve") is determined by curve cost module 308.

Curve cost module 308 determines a cost for each path curve. Each path curve is defined by a plurality of points.

Each point in the path curve has a plurality of attributes associated with the point. The cost for the path curve has at least these same attributes. Attributes of a point on a path curve can include a first category having a first priority and an associated logical value. In an embodiment, the first category can be "obstacle" and the value of the attribute indicates whether the point on the path curve coincides with an obstacle to the ADV. In an embodiment, the first category can alternatively include whether the point on the path curve is more likely than not leading to an imminent serious collision or injury to a person outside the ADV. In an embodiment, attributes can further includes a second category having a second priority, lower than the first priority. In an embodiment, the second category can be a "physical lane boundary" with a logical value that indicates whether the point on the path curve is outside a physical lane boundary. In an embodiment, the second category can alternatively include whether the point on the path curve is more likely that not leading to a collision with moderate property damage, or a moderate or non-fatal injury. In an embodiment, the third category, can have a third priority, lower than the second priority. The third category can be "virtual lane boundary," and the value of the attribute is a logical value that indicates whether the point on the path curve is outside of a virtual lane boundary of the ADV. A virtual lane boundary can be, e.g., a portion of the physical roadway that the perception and planning module has deemed as a viable lane for the ADV to travel. In an embodiment, the third category can alternatively include whether the point on the path curve is more likely than not to lead to medium property damage or medium injury to a person. Logical values can be Boolean (TRUE or FALSE) or binary with, e.g. 1=TRUE and 0=FALSE. In an embodiment, a FALSE value is less than a TRUE value, for purposes of determining a cost of the path curve. In an embodiment, a fourth category is associated with a fourth priority, less than the third priority. The fourth category can be "safety/comfort" and the value of the attribute can be numeric, such that a lower value for the attribute indicates more safety and/or comfort for the occupants of the ADV than a higher value. In an embodiment, the safety/comfort value can also take into account safety and/or comfort of persons perceived by the ADV perception module 302. In an embodiment, the fourth category can alternatively be whether the point on the path curve is more likely than not to lead to minor property damage or minor injury to a person. The safety/comfort value can be determined by a safety/comfort module 309.

Safety/comfort module 309 can determine a numeric value representing the safety and/or comfort of occupants of the ADV at a point on a path curve. A comfort value for occupants of the ADV can be determined using one or more inputs from, e.g., sensor system inertial management unit (IMU) 213, steering input 201, throttle unit 202 input, and braking unit 203 input, and a speedometer, to assess lateral and forward/rearward forces experienced by occupants of the ADV. A safety value can be determined from inputs from perception and planning system 110 using perceived objects, predicted stopping times, predicted proximity to pedestrians, and other obstacles surrounding the ADV. In an embodiment, this fourth category comprise two values: one for safety and another for comfort. In an embodiment, safety/comfort module 309 can determine a single safety/comfort value from separate values for safety and comfort. In an embodiment, safety/comfort module 309 can determine the safety/comfort value as a single value. In an embodiment, a lower safety/comfort value indicates more safety and/or more comfort for occupants of the ADV. In an embodiment, the safety/comfort value can further take into account safety of persons or property outside the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
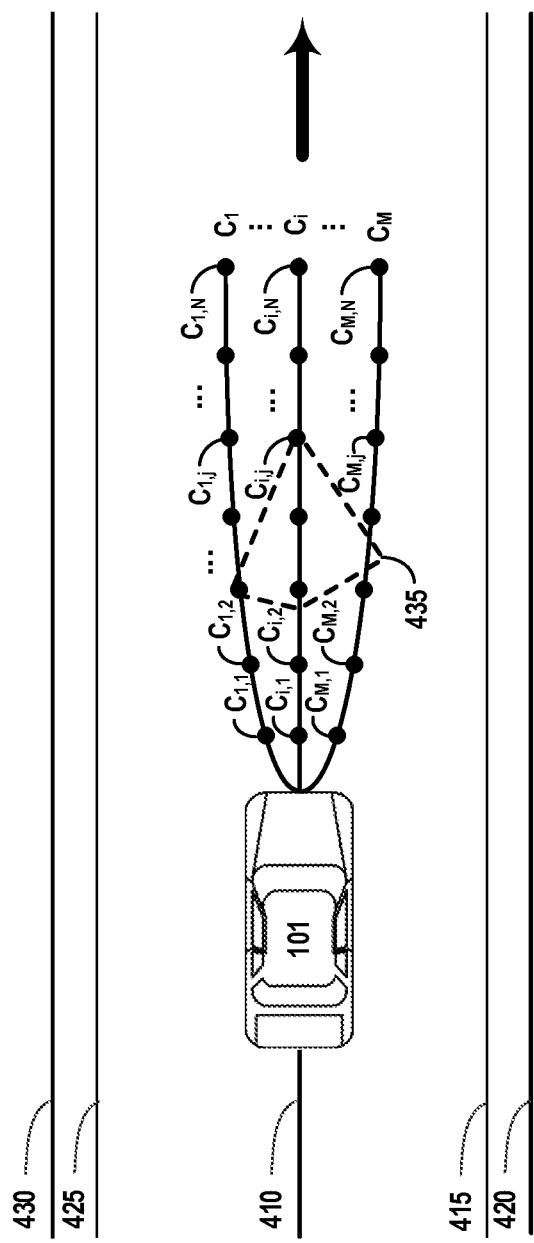
FIG. 4 illustrates a plurality of candidate paths upon which to apply a new cost design for path selection for an autonomous driving vehicle (ADV) according to one embodiment.

FIG. 4 illustrates a plurality of autonomous driving vehicle (ADV) 101 path curves $C_1 \ldots C_M$ upon which to apply a new cost design for path selection for an ADV according to one embodiment. In FIG. 4, the physical roadway has one direction, shown by the bold arrow facing to the right in the page. The physical roadway can be delineated by roadway edges 420 and 430. Virtual lane boundaries 415 and 425 can delineate a portion of the physical roadway designated by the ADV control logic as viable locations for the ADV to travel within the physical roadway. An ADV can have a navigation reference line, e.g. 410, indicating a planned route for the ADV. An obstacle 435, indicated by dashed lines, may be present on the planned route 410 for the ADV. Prediction module 303 can predict the behavior of obstacle 435, i.e., whether the object is moving or not, and if moving, a predicted speed and direction. Planning module 305 can determine a plurality of candidate path curves $C_1 \ldots C_M$ for navigating the ADV 101 with respect to the obstacle 435. Each candidate path curve $C_i$, for i=to M, can have an associated cost for the path curve. Planning module 305 can select the least cost path curve from the plurality of candidate path curves for navigating the ADV 101 with respect to the obstacle 435.

Each candidate path curve can be defined by a plurality of points, j=1 to N. Each point on each curve has a plurality of attributes, each attribute having a category, a priority, and a cost value. In an embodiment, a first category having a first priority can be "obstacle," which is a logical value indicating whether the path curve point, $C_{i,j}$, coincides with an obstacle 435 to the ADV 101 at point $C_{i,j}$. A second category having a second priority, less that the first priority, can be "physical-boundary," which is a logical value indicating whether the path curve point, $C_{i,j}$, is outside the physical roadway defined by lines 420 and 430. A third category having a third priority, less than the second priority, can be "virtual boundary," which is a logical value indicating whether the path curve point, $C_{i,j}$, is outside the virtual roadway boundary defined by lines 415 and 425. A fourth category having a fourth priority, less than the third priority, can be "safety/comfort," having a numeric value representing the safety/comfort assessment value at point $C_{i,j}$ for occupants of the ADV. In an embodiment, safety/comfort can alternatively, or in addition, take into account safety of persons outside the ADV 101. Logical values indicating FALSE are less than logical values indicating TRUE. A lower value of safety/comfort is safer/more comfortable for occupants of the ADV. A safety/comfort value for each point in a path curve $C_i$ can be determined by safety/comfort module 309. A cost for each path curve, $C_i$, can be determined by curve cost module 308, then a least cost curve can be selected from the cost of the candidate path curves $C_i$, i=1 to M, to use for navigating the ADV 101 along the route 410 with respect to the obstacle 435. Determining a cost for each candidate path curve $C_i$ is described below with reference to FIG. 7. Selecting a least cost curve is described below with reference to FIGS. 8A and 8B.

Figure 5:
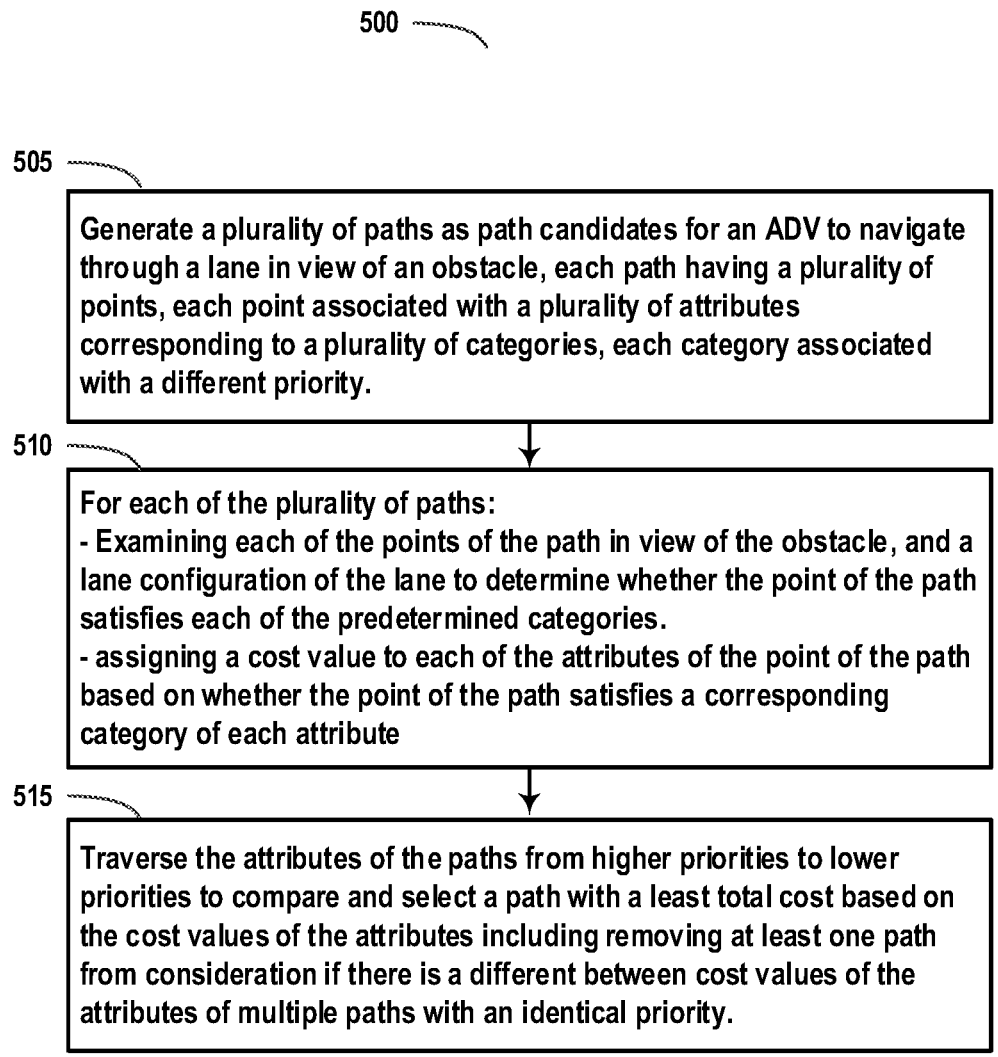
FIG. 5 is a block diagram illustrating a method of implementing a new cost design for path selection for an autonomous driving vehicle (ADV) according to one embodiment.

FIG. 5 is a block diagram illustrating a method 500 of implementing a new cost design for path selection for an autonomous driving vehicle (ADV) according to one embodiment.

In operation 505, ADV 101, planning module 305 or routing module 307 can generate a plurality of candidate path curves for an ADV 101 to use to navigate a segment of a route on a roadway in view of a possible obstacle in the roadway, and other driving conditions. Each candidate path curve can have a plurality of points. Each point in the plurality of points can be associated with a plurality of attributes corresponding to a plurality of categories. A first category can be whether an obstacle to the ADV coincides with the point. In an embodiment, the first category can alternatively be whether there is a 51% or greater chance of a serious collision, or a 51% or greater chance of a serious injury or fatality at the point in the candidate path curve. A second category can be whether the ADV would be outside the physical boundary of a roadway at the point in the candidate path curve. In an embodiment, the second category can alternatively be whether there is a 51% or greater chance of a moderate collision, or a 51% or greater chance of a serious, but non-fatal injury at the point in the candidate path curve. A third category can be whether the ADV would be outside a virtual lane boundary at the point in the candidate path curve. In an embodiment, the third category can be whether there is a 51% or greater chance of a minor collision with minor property damage and no injury to person(s). Each category can be associated with a different priority.

In operation 510, for each of the plurality of candidate path curves, curve cost module 308 can examine each point in the candidate path curve, in view of a possible obstacle on the roadway, and a lane configuration of the roadway, to determine whether the point on the path curve satisfies each of the predetermined categories. A cost value can be assigned to each of the attributes of each point in the plurality of points in the candidate path curve based on whether the point of the path curve satisfies a corresponding category of each attribute. A cost of each candidate path curve can be determined, using the attributes, categories, and priorities. The cost of each candidate path curve can have the same attributes, categories, and priorities as the points that define the candidate path curve.

In operation 515, the attributes of each candidate path curve can be traversed, from higher priorities to lower priorities to compare and select a path curve with a least total cost based on the cost values of the attributes at each point in the path curve. At least one candidate path curve may be removed from consideration if there is a difference cost between cost values of the attributes of multiple candidate curve paths with an identical priority.

Figure 6:
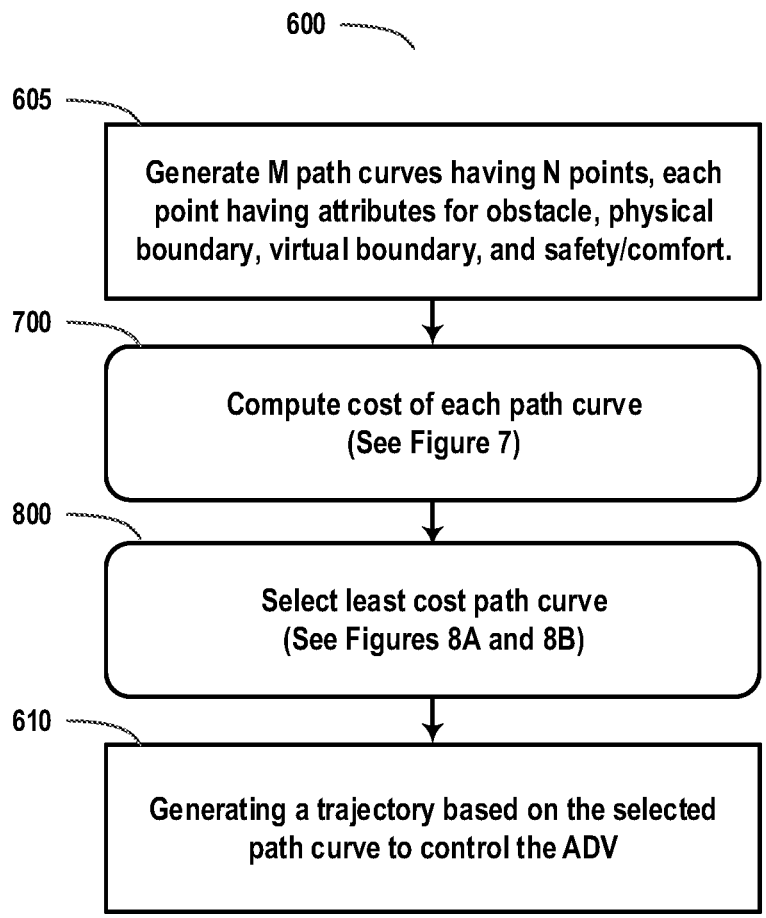
FIG. 6 is a block diagram illustrating a method of implementing a new cost design for path selection for an autonomous driving vehicle (ADV) according to one embodiment.

FIG. 6 is a block diagrams illustrating a method 600 of implementing a new cost design for path selection for an autonomous driving vehicle (ADV) according to one embodiment.

In operation 605, planning module 305 or routing module 307 can generate a plurality, M, of candidate path curves each representing a possible path for the ADV 101 to navigate a segment of the roadway, in view of driving conditions on the roadway. Each of the M candidate path curves can have a plurality, N, of points that define the path curve. Each point in a candidate path curve can have an attribute for "obstacle," having a logical value indicating whether the point on the candidate path coincides with an obstacle 435 on the roadway. Obstacle can be a first attribute of the point having a first, highest, priority when determining cost of a candidate path curve. Each point can also have an attribute "physical-boundary," indicating whether the point on the candidate path curve is located outside a physical boundary of the roadway, such as between lines 420 and 430 of FIG. 4, above. Physical-boundary can be a second attribute of the point having a second priority, lower than the first priority, when determining cost of the candidate path curve. Each point can also have an attribute "virtual-boundary," indicating whether the point on the candidate path curve is located outside a virtual lane boundary for the ADV. The virtual lane boundary can be determined by ADV logic. The virtual boundary can be within the physical boundary of the roadway lane. Each point can have a variable "safety/comfort," indicating value of ADV occupant safety and/or comfort at the point in the candidate path curve. In an embodiment, a lower value for safety/comfort indicates greater safety/comfort that a higher value.

In operation 700, a cost for each candidate path curve can be determined from the values of the attributes for each point in each candidate path curve. An method of determining cost of a path curve is described below with reference to FIG. 7.

In operation 800, a least cost candidate path curve can be selected from the plurality, M, of candidate path curves. A method of determining a least cost path curve from the plurality of candidate path curves is described below, with reference to FIGS. 8A and 8B.

In operation 610, planning module 305 can determine a trajectory for the ADV 101 based on the least cost path curve determined in operation 800.

Figure 7:
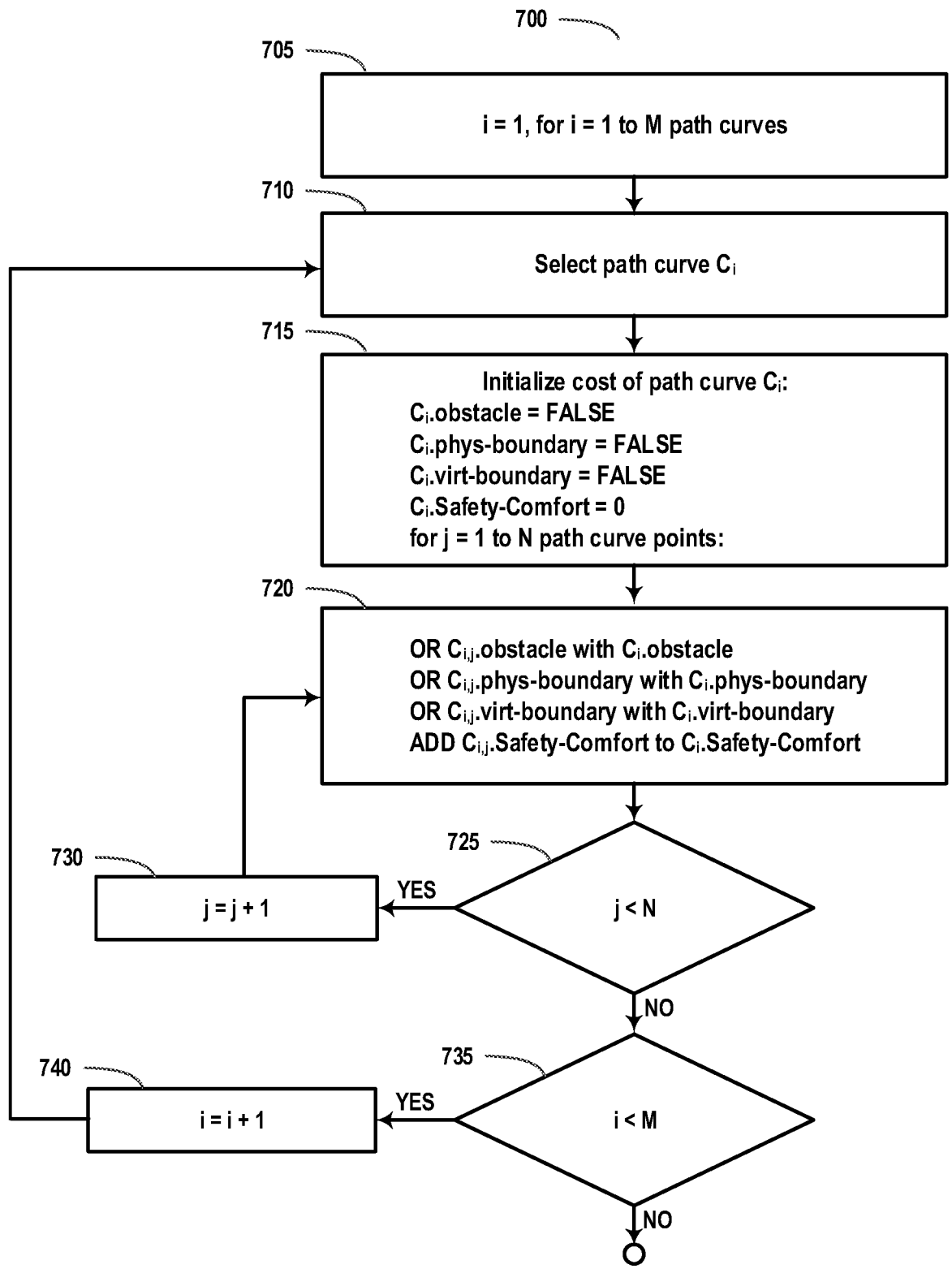
FIG. 7 is a block diagram illustrating a method of implementing a new cost design for path selection for an autonomous driving vehicle (ADV) according to one embodiment.

FIG. 7 is a block diagram illustration a method 700 of determining a least cost path curve from a plurality of path curves for an autonomous driving vehicle (ADV) 101 according to one embodiment. In the described below of method 700, cost attributes of obstacle, physical boundary, logical boundary, and safety/comfort are used for cost analysis. As described above, other, or additional, attributes can be used to determine path curve cost.

In operation 705, a loop counter variable, i, can be initialized to 1. The loop counter controls traversal of the M plurality of candidate path curves to determine a cost for each path curve. Each path curve can have a plurality of N points in the path curve.

In operation 710, a candidate path curve $C_i$ is selected for the current value of i.

In operation 715, variables for the cost of the path curve $C_i$ can be initialized. The variables for cost of a path curve correspond to the attributes, categories, and values of each point $C_{i,j}$ of a path curve $C_i$. A first cost attribute, "obstacle," having a logical value can be initialized to FALSE. A second cost attribute, "physical-boundary," having a logical value can be initialized to FALSE. A third cost attribute, "virtual-boundary," having a logical value can be initialized to FALSE. A fourth cost attribute, "safety/comfort," having a numeric value can be initialized to 0. A loop counter variable, j, for traversing the points in each candidate path curve $C_i$, can be initialized to 1.

In operation 720, the cost attributes of a point $C_{i,j}$ of a candidate path curve $C_i$ can be processed into the cost of the candidate path curve $C_i$. Cost attribute "obstacle" of path curve $C_i$ can be logically OR'd with point $C_{i,j}$ cost attribute "obstacle" and the result stored into cost attribute "obstacle" for path curve $C_i$. Cost attribute "physical boundary" of path curve $C_i$ can be logically OR'd with point $C_{i,j}$ cost attribute "physical boundary" and the result stored into cost attribute "physical boundary" for path curve $C_i$. Cost attribute "virtual boundary" of path curve $C_i$ can be logically OR'd with point $C_{i,j}$ cost attribute "virtual boundary" and the result stored into cost attribute "virtual boundary" for path curve $C_i$. Cost attribute "safety/comfort" of point $C_{i,j}$ can be added to path curve $C_i$ cost attribute "safety/comfort" and the result stored into cost attribute "safety/comfort" for path curve $C_i$.

In operation 725, it can be determined whether point loop counter j is less than N. If so, then there are more points $C_{i,j}$ in the curve $C_i$ to process and method 700 continues at operation 730. Otherwise, method 700 continues at operation 735.

In operation 730, point loop counter j is incremented and method 700 continues at operation 720 with a next point $C_{i,j}$ of curve $C_i$.

In operation 735, it can be determined whether path curve loop counter i is less than M. If so, then there are more candidate path curves $C_i$ to process and method 700 continues at operation 710. Otherwise method 700 ends.

Figure 8A:
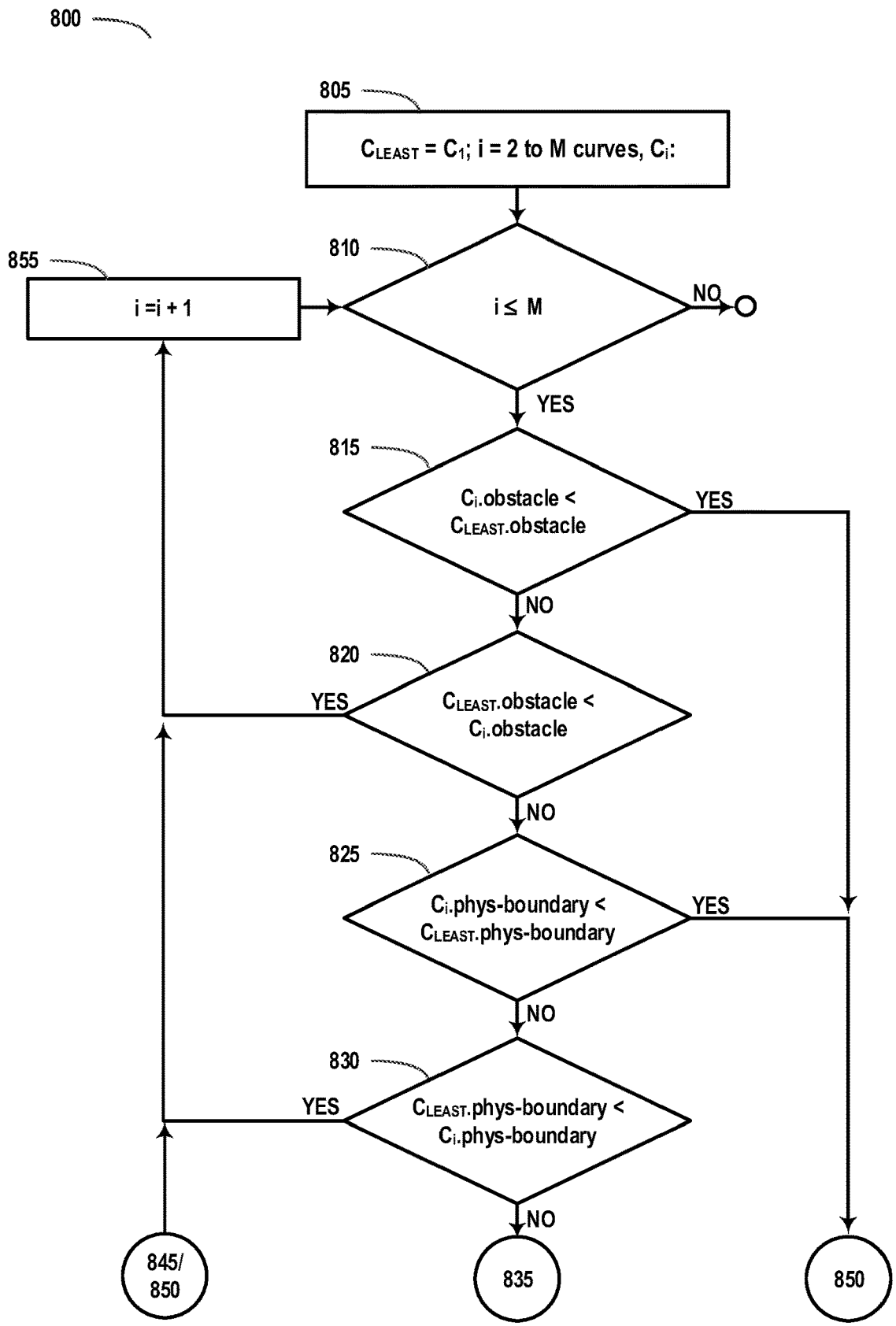
FIGS. 8A and 8B are a block diagrams illustration a method of determining a least cost path curve from a plurality of candidate path curves for an autonomous driving vehicle according to one embodiment.
Figure 8B:
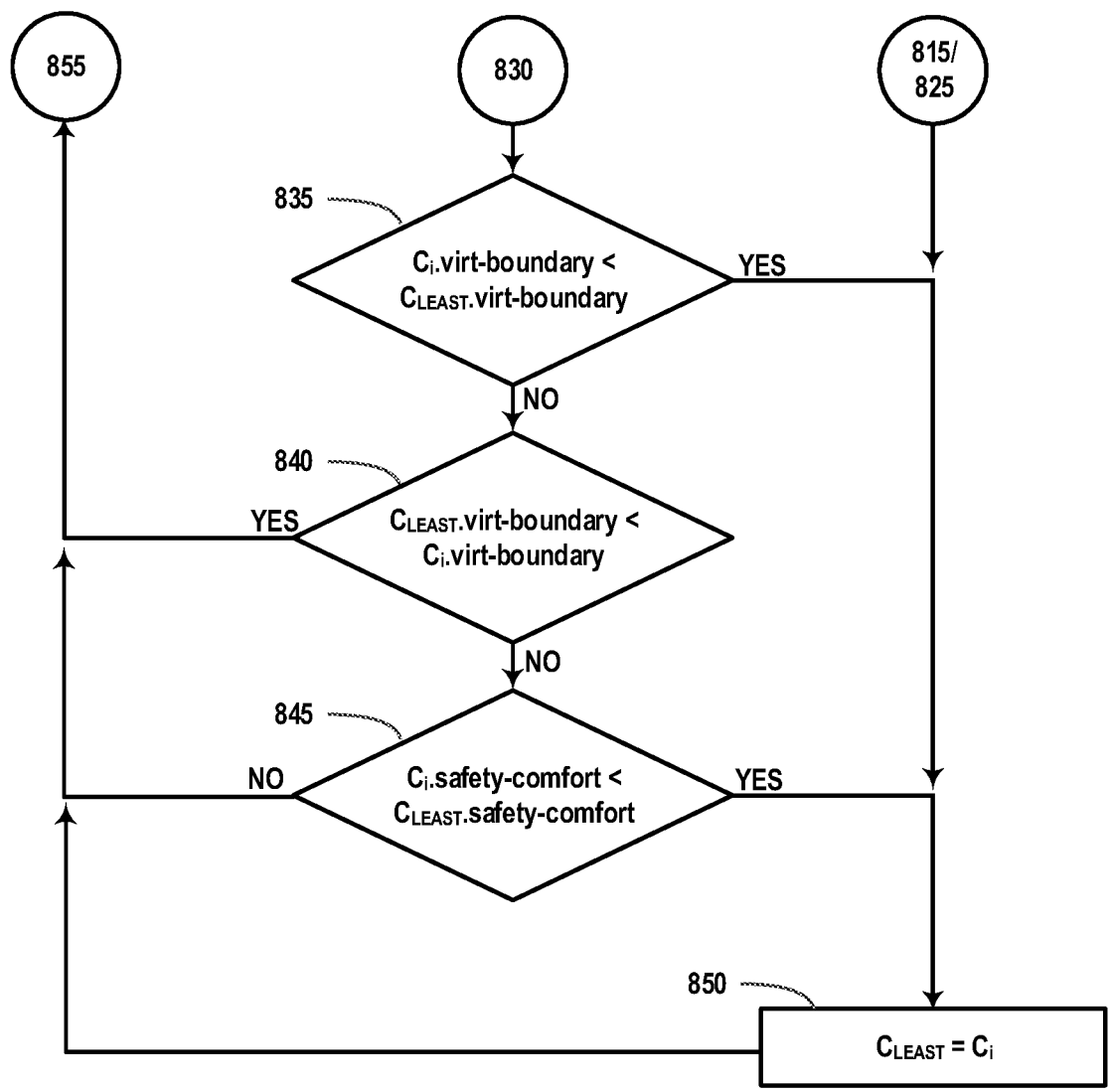

FIGS. 8A and 8B are a block diagram illustration of a method 800 of determining a least cost path curve from a plurality of path curves for an autonomous driving vehicle (ADV) 101 according to one embodiment. In the method 800 described below, cost attributes of obstacle, physical boundary, logical boundary, and safety/comfort are used for determining a least cost path curve from a plurality of M candidate path curves. As described above, other, or additional, attributes can be used to determine path curve cost.

In operation 805, the attributes of a cost data structure for storing the least cost path curve, $C_{LEAST}$, from a plurality of M candidate path curves is initialized to the cost attributes of candidate path curve $C_1$. A path curve loop counter variable i is initialized to 2.

In operation 810 it can be determined whether there are more path curves, $C_i$, to process by checking whether loop counter variable i is less than or equal to M, where M is the number of candidate path curves in the plurality of path curves. If i≤M, then method 800 continues at operation 815, otherwise method 800 ends.

In operation 815, it can be determined whether the first attribute category, e.g. "obstacle," of curve $C_i$ is strictly less than the corresponding attribute of $C_{LEAST}$. If so, then it has been determined that the cost of $C_i$ is less than the cost of $C_{LEAST}$ and method 800 continues at operation 850, described below with reference to FIG. 8B. Otherwise method 800 continues at operation 820.

In operation 820, it can be determined whether the first attribute category, e.g. "obstacle," of $C_{LEAST}$ is strictly less than the corresponding attribute of $C_i$. If so, then it has been determined that $C_{LEAST}$ continues to be the least cost path curve so far, no further attributes need be evaluated, and method 800 continues at operation 855. Otherwise, by operations 815 and 820, it has been determined that $C_i$ and $C_{LEAST}$ have the same value for the first attribute and further attributes are evaluated to determine a least cost path curve at operation 825.

In operation 825, it can be determined whether the second attribute category, e.g. "physical boundary," of curve $C_i$ is strictly less than the corresponding attribute of $C_{LEAST}$. If so, then it has been determined that the cost of $C_i$ is less than the cost of $C_{LEAST}$ and method 800 continues at operation 850, described below with reference to FIG. 8B. Otherwise method 800 continues at operation 830.

In operation 830, it can be determined whether the second attribute category, e.g. "physical boundary," of $C_{LEAST}$ is strictly less than the corresponding attribute of $C_i$. If so, then it has been determined that $C_{LEAST}$ continues to be the least cost path curve so far, no further attributes need be evaluated, and method 800 continues at operation 855. Otherwise, by operations 825 and 830, it has been determined that $C_i$ and $C_{LEAST}$ have the same value for the first and second attributes and further attributes are evaluated to determine a least cost path curve in operation 835. Operation 835 is described below with reference to FIG. 8B.

In operation 835, shown on FIG. 8B, it can be determined whether the third attribute category, e.g. "virtual boundary," of curve $C_i$ is strictly less than the corresponding attribute of $C_{LEAST}$. If so, then it has been determined that the cost of $C_i$ is less than the cost of $C_{LEAST}$ and method 800 continues at operation 850. Otherwise method 800 continues at operation 840.

In operation 840, it can be determined whether the third attribute category, e.g. "virtual boundary," of $C_{LEAST}$ is strictly less than the corresponding attribute of $C_i$. If so, then it has been determined that $C_{LEAST}$ continues to be the least cost path curve so far, no further attributes need be evaluated, and method 800 continues at operation 855. Otherwise, by operations 835 and 840, it has been determined that $C_i$ and $C_{LEAST}$ have the same value for the first, second, and third attributes and further attributes are evaluated to determine a least cost path curve in operation 845.

In operation 845, it can be determined whether the fourth attribute category, e.g. "safety/comfort," of curve $C_i$ is strictly less than the corresponding attribute of $C_{LEAST}$. If so, then it has been determined that the cost of $C_i$ is less than the cost of $C_{LEAST}$ and method 800 continues at operation 850, described below with reference to FIG. 8B. Otherwise, it has been determined that $C_i$ is either the same cost, or greater cost, than $C_{LEAST}$, and method 800 continues at operation 855 shown on FIG. 8A.

In operation 850, it has been determined that the cost of $C_i$ is strictly less than $C_{LEAST}$. The cost attributes of $C_{LEAST}$ are set equal to the cost attributes of $C_i$, and method 800 continues at operation 855, shown on FIG. 8A.

Returning to FIG. 8A, in operation 855, the path curve counter variable i is incremented and method 800 continues at operation 810 to determine whether the cost of path curve $C_i$ is strictly less than the cost of $C_{LEAST}$.

Figure 9:
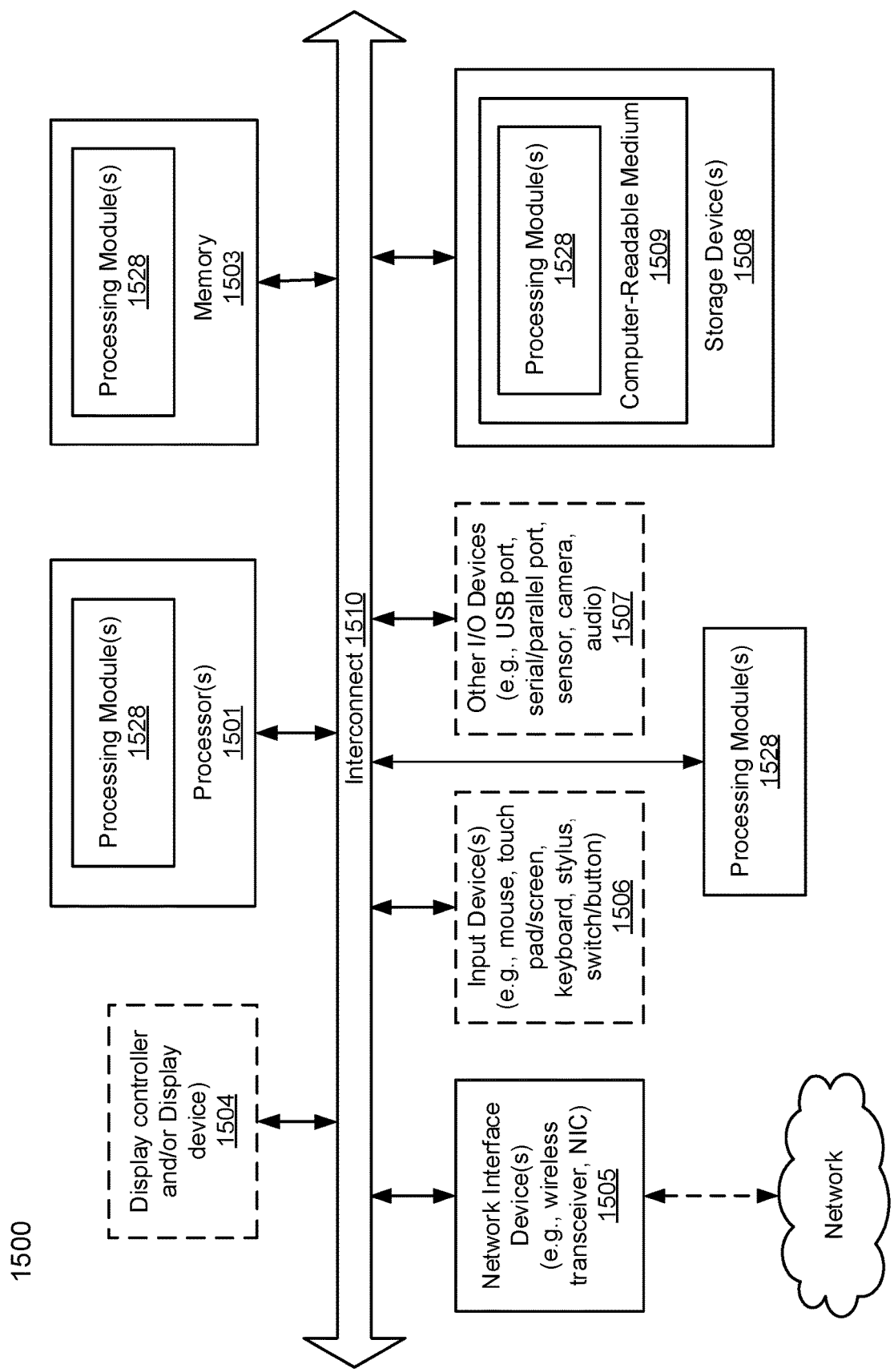
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or curve cost module 308, and safety/comfort module 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating a path to drive an autonomous driving vehicle, the method comprising:

generating a plurality of paths as path candidates for an autonomous driving vehicle (ADV) to navigate through a lane in view of an obstacle, each path having a plurality of points, wherein each point is associated with a plurality of attributes corresponding to a plurality of categories, each category being associated with a different priority;

for each of the plurality of paths,
examining each of the points of the path in view of the obstacle and a lane configuration of the lane to determine whether the point of the path satisfies each of the predetermined categories,
assigning a cost value to each of the attributes of the point of the path based on whether the point of the path satisfies a corresponding category of each attribute; and traversing the attributes of the paths from higher priorities to lower priorities to compare and select a path with a least total cost based on the cost values of the attributes, including removing at least one path from consideration if there is a difference between cost values of attributes of multiple paths with an identical priority; and navigating the ADV using the selected path with the least total cost.

2. The method of claim 1, further comprising, for each attribute of a particular category of each path, aggregating the cost values of the attributes of the same category of all points of the path to generate an aggregated cost value for the attribute, wherein comparing and selecting a path are performed based on the aggregated cost values of the attributes.

3. The method of claim 1, wherein the plurality of categories comprise:
an obstacle category associated with a first priority to indicate whether the ADV potentially collides with the obstacle; and
a lane boundary category associated with a second priority to indicate whether the ADV potentially move outside of a lane boundary of the lane, wherein the first priority is higher than the second priority.

4. The method of claim 3, wherein an attribute corresponding to the obstacle category or the lane boundary category is a binary attribute having a predetermined logical value indicating whether the attribute satisfies a corresponding category.

5. The method of claim 3, wherein the plurality of categories further comprise a comfort category associated with a third priority representing a comfort level of a passenger of the ADV, wherein the third priority is lower than the second priority.

6. The method of claim 5, wherein an attribute corresponding to the comfort category contains a numeric value representing the comfort level determined based in part on a curvature of a corresponding path.

7. The method of claim 3, wherein the lane boundary category comprises:
a physical lane boundary associated with a fourth priority, the physical lane boundary representing a boundary of a physical lane; and
a virtual lane boundary associated with a fifth priority, the virtual lane boundary representing a boundary of one of a plurality of virtual lanes of a physical lane, wherein the fourth priority is higher than the fifth priority.

8. A non-transitory computer-readable programmed with executable instructions that, when executed by a processing system comprising at least one hardware processor, perform operations that implement a method for determining a least cost path curve for a plurality of path curves for operating an autonomous driving vehicle (ADV), the operations comprising:
generating a plurality of paths as path candidates for an autonomous driving vehicle (ADV) to navigate through a lane in view of an obstacle, each path having a plurality of points, wherein each point is associated with a plurality of attributes corresponding to a plurality of categories, each category being associated with a different priority;
for each of the plurality of paths,
examining each of the points of the path in view of the obstacle and a lane configuration of the lane to determine whether the point of the path satisfies each of the predetermined categories,
assigning a cost value to each of the attributes of the point of the path based on whether the point of the path satisfies a corresponding category of each attribute; and
traversing the attributes of the paths from higher priorities to lower priorities to compare and select a path with a least total cost based on the cost values of the attributes, including removing at least one path from consideration if there is a difference between cost values of attributes of multiple paths with an identical priority; and
navigating the ADV using the selected path with the least total cost.

9. The medium of claim 8, the operations further comprising, for each attribute of a particular category of each path, aggregating the cost values of the attributes of the same category of all points of the path to generate an aggregated cost value for the attribute, wherein comparing and selecting a path are performed based on the aggregated cost values of the attributes.

10. The medium of claim 8, wherein the plurality of categories comprise:
an obstacle category associated with a first priority to indicate whether the ADV potentially collides with the obstacle; and
a lane boundary category associated with a second priority to indicate whether the ADV potentially move outside of a lane boundary of the lane, wherein the first priority is higher than the second priority.

11. The medium of claim 10, wherein an attribute corresponding to the obstacle category or the lane boundary category is a binary attribute having a predetermined logical value indicating whether the attribute satisfies a corresponding category.

12. The medium of claim 10, wherein the plurality of categories further comprise a comfort category associated with a third priority representing a comfort level of a passenger of the ADV, wherein the third priority is lower than the second priority.

13. The medium of claim 12, wherein an attribute corresponding to the comfort category contains a numeric value representing the comfort level determined based in part on a curvature of a corresponding path.

14. The medium of claim 10, wherein the lane boundary category comprises:
a physical lane boundary associated with a fourth priority, the physical lane boundary representing a boundary of a physical lane; and
a virtual lane boundary associated with a fifth priority, the virtual lane boundary representing a boundary of one of a plurality of virtual lanes of a physical lane, wherein the fourth priority is higher than the fifth priority.

15. A system comprising a processing system comprising at least one hardware processor, coupled to a memory programmed with executable instructions that when executed by the processing system, perform operations that implement a method for determining a least cost path curve for a plurality of path curves for operating an autonomous driving vehicle (ADV), the operations comprising:
generating a plurality of paths as path candidates for an autonomous driving vehicle (ADV) to navigate through a lane in view of an obstacle, each path having a plurality of points, wherein each point is associated with a plurality of attributes corresponding to a plurality of categories, each category being associated with a different priority;
for each of the plurality of paths,
examining each of the points of the path in view of the obstacle and a lane configuration of the lane to determine whether the point of the path satisfies each of the predetermined categories, and
assigning a cost value to each of the attributes of the point of the path based on whether the point of the path satisfies a corresponding category of each attribute;
traversing the attributes of the paths from higher priorities to lower priorities to compare and select a path with a least total cost based on the cost values of the attributes, including removing at least one path from consideration if there is a difference between cost values of attributes of multiple paths with an identical priority; and navigating the ADV using the selected path with the least total cost.

16. The system of claim 15, the operations further comprising, for each attribute of a particular category of each path, aggregating the cost values of the attributes of the same category of all points of the path to generate an aggregated cost value for the attribute, wherein comparing and selecting a path are performed based on the aggregated cost values of the attributes.

17. The system of claim 15, wherein the plurality of categories comprise:
    an obstacle category associated with a first priority to indicate whether the ADV potentially collides with the obstacle; and
    a lane boundary category associated with a second priority to indicate whether the ADV potentially move outside of a lane boundary of the lane, wherein the first priority is higher than the second priority.

18. The system of claim 17, wherein an attribute corresponding to the obstacle category or the lane boundary category is a binary attribute having a predetermined logical value indicating whether the attribute satisfies a corresponding category.

19. The system of claim 17, wherein the plurality of categories further comprise a comfort category associated with a third priority representing a comfort level of a passenger of the ADV, wherein the third priority is lower than the second priority.

20. The system of claim 19, wherein an attribute corresponding to the comfort category contains a numeric value representing the comfort level determined based in part on a curvature of a corresponding path.

21. The system of claim 17, wherein the lane boundary category comprises:
    a physical lane boundary associated with a fourth priority, the physical lane boundary representing a boundary of a physical lane; and
    a virtual lane boundary associated with a fifth priority, the virtual lane boundary representing a boundary of one of a plurality of virtual lanes of a physical lane, wherein the fourth priority is higher than the fifth priority.

* * * * *